United States Patent [19]

Kühl

[11] Patent Number: 4,552,739
[45] Date of Patent: Nov. 12, 1985

[54] METHOD OF PREPARING CRYSTALLINE ZEOLITE ZSM-12 AND PRODUCT

[75] Inventor: Günter H. Kühl, Cherry Hill, N.J.

[73] Assignee: Mobil Oil Corporation, New York, N.Y.

[21] Appl. No.: 729,099

[22] Filed: May 3, 1985

Related U.S. Application Data

[63] Continuation of Ser. No. 559,669, Dec. 9, 1983, abandoned.

[51] Int. Cl.$^4$ .............................................. C01B 33/28
[52] U.S. Cl. .................................... 423/328; 423/329; 423/332; 423/335; 502/62
[58] Field of Search ................................ 423/326–332, 423/335; 502/60, 62, 71, 77; 260/488 C

[56] References Cited

U.S. PATENT DOCUMENTS

| | | | |
|---|---|---|---|
| 3,709,979 | 1/1973 | Chu | 423/328 |
| 3,832,449 | 8/1974 | Rosinski et al. | 423/328 |
| 4,452,769 | 6/1984 | Chu et al. | 423/329 |

OTHER PUBLICATIONS

Breck, "Zeolite Molecular Sieves", 1974, pp. 549–552.

*Primary Examiner*—Edward J. Meros
*Attorney, Agent, or Firm*—Alexander J. McKillop; Michael G. Gilman; Dennis P. Santini

[57] ABSTRACT

A novel method for preparing ZSM-12 utilizing diethyldimethylammonium cation in the forming solution.

5 Claims, No Drawings

METHOD OF PREPARING CRYSTALLINE ZEOLITE ZSM-12 AND PRODUCT

This is a continuation of copending application Ser. No. 559,669, filed on Dec. 9, 1983, now abandoned.

CROSS REFERENCE TO RELATED APPLICATIONS

This application is related to application Ser. No. 140,466, filed Apr. 17, 1980, now abandoned, directed to Synthesis of ZSM-12 with Methyltriethylammonium Cations.

BACKGROUND OF THE INVENTION

1. Field of the Invention

This invention relates to a novel method for preparing a crystalline zeolite ZSM-12.

2. Description of the Prior Art

Zeolitic materials, both natural and synthetic, have been demonstrated in the past to have catalytic properties for various types of hydrocarbons conversion. Certain zeolitic materials are ordered, porous crystalline aluminosilicates having a definite crystalline structure as determined by x-ray diffraction, within which there are a large number of smaller cavities which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially with another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), zeolite ZSM-5 (U.S. Pat. No. 3,702,886), and zeolite ZSM-11 (U.S. Pat. No. 3,709,979) and zeolite ZSM-12 (U.S. Pat. No. 3,832,449), merely to name a few.

SUMMARY OF THE INVENTION

The present invention is directed to a novel method for preparing a group of crystalline materials hereinafter designated as ZSM-12, comprising crystallizing substantially pure ZSM-12 material from a silica and alumina gel mixture in the presence of a diethyldimethylammonium cation, and the ZSM-12 product produced thereby.

ZSM-12 compositions can be identified, in terms of mole ratios of oxides as follows:

$$(1.0\pm0.4)M_{2/n}/O.Al_2O_3.XSiO_2zH_2O$$

wherein M is at least one cation having a valence n. X can range from 20 to infinity and z can range from 0 to 60.

Catalytically-active members of the ZSM-12 family of zeolites disclosed herein have a definite x-ray diffraction pattern which distinguishes them from other crystalline materials, the x-ray diffraction pattern having the following significant lines:

TABLE 1

| Interplanar Spacing d(A) | Relative Intensity I/Io |
| --- | --- |
| 11.9 ± 0.2 | M |
| 10.1 ± 0.2 | M |
| 4.76 ± 0.1 | W |
| 4.29 ± 0.08 | VS |
| 3.98 ± 0.08 | W |
| 3.87 ± 0.07 | VS |
| 3.49 ± 0.07 | M |
| 3.38 ± 0.07 | M |
| 3.20 ± 0.06 | W |
| 3.05 ± 0.05 | W |
| 2.54 ± 0.03 | W |

These X-ray diffraction data were collected with the Philips APD-3600 X-ray system, using copper K-alpha radiation. The positions of the peaks, expressed in degrees 2 theta, where theta is the Bragg angle, were determined by step-scanning at 0.02 degrees of 2 theta intervals and a counting time of 2 seconds for each step. The interplanar spacing, d, measured in Angstrom units (A), and the relative intensities of the lines, $I/I_o$, where $I_o$ is one-hundredth of the intensity of the strongest line, including subtractinon of the background, were derived with the use of the software "ADP Peak Algorithm". The relative intensities are given in terms of the symbols vs=very strong, s=strong, m=medium and w=weak. It should be understood that this X-ray diffraction pattern is characteristic of all the species of zeolite compositions synthesized by the present invention. Ion exchange of the alkali metal cations with other ions results in a zeolite which reveals substantially the same X-ray diffraction pattern with some minor shifts in interplanar spacing and variaton in relative intensity. Other minor variations can occur, depending on the silica to alumina ratio of the particular sample, as well as its degree of thermal treatment.

The ZSM-12 zeolite can be used either in the alkali metal form, e.g. the sodium form, the ammonium form, the hydrogen form or another univalent or multivalent form. When used as a catalyst it will be subjected to thermal treatment to remove part or all of any organic constituent.

Zeolite ZSM-12, U.S. Pat. No. 3,832,449 (incorporated herein by reference), was originally crystallized in the presence of tetraethylammonium (TEA) ions. By this invention it has been found that a ZSM-12 material crystallizes in the presence of a commercially available diethyldimethylammonium (DEDMA) cation.

Additionally, due to the newly discovered steric compatibility between DEDMA ion and ZSM-12 type structures, it has been unexpectedly discovered that the resulting ZSM-12 is purer and essentially free of ZSM-5. Additionally, the ZSM-12 produced is in the form of well developed rod-shaped crystals (~6μ long) at $SiO_2/Al_2O_3$ ratios greater than 140.

The new silico-crystal can be prepared from a reaction mixture containing a source of silica, alumina, diethyldimethylammonium (DEDMA), an alkali metal oxide, e.g. sodium, and water, and having a composition in terms of mole ratios of oxides, falling within the following ratios:

| Reactants | Broad | Preferred |
| --- | --- | --- |
| $SiO_2/Al_2O_3$ | 40 or higher to ∞ | 80 or higher to ∞ |
| $M_2O/(DEDMA)_2O$ | 0.2–2.0 | 0.3–1.8 |
| $H_2O/OH^-$ | 50–400 | 70–350 |
| $OH^-/SiO_2$ | 0.05–0.35 | 0.10–0.30 | wherein M is alkali or alkaline earth metal and maintaining the mixture at crystallization temperature until crystals of the zeolite material are formed. It is particularly preferred to use the halide form of DEDMA, e.g. chloride, bromide, etc.

DESCRIPTION OF PREFERRED EMBODIMENTS

Crystallization can be carried out at either static or stirred condition. In our examples static conditions were employed using polypropylene jars at 100° C. or teflon-lined stainless steel autoclaves at temperatures above 100° C. The total useful range of temperatures is 80° C. to 200° C. for about six hours to 150 days. Thereafter, the zeolite crystals are separated from the liquid and recovered. The composition can be prepared utilizing materials which supply the appropriate oxides. Reaction mixtures can include sodium silicate, silica hydrosol, silica gel, silicic acid, and sodium hydroxide, and diethyldimethylammonium (e.g. DEDMA Br). The reaction mixture can be prepared either batch-wise or continuously. Crystal size and crystallization time of the present ZSM-12 composition will vary with the nature of the reaction mixture employed and the crystallization conditions.

As indicated above, the zeolite crystals prepared by the instant invention are shaped in a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the catalyst crystals can be extruded before drying or dried or partially dried and then extruded.

Zeolite ZSM-12 can also be used as a catalyst in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to it such as, for example, by, in the case of platinum, treating the zeolite with a solution containing a platinum metal-containing ion. Thus, suitable platinum compounds include chloroplatinic acid, platinous chloride and various compounds containing the tetraamineplatinum complex.

The above ZSM-12 crystal especially in its metal, hydrogen, ammonium and diethyldimethylammonium forms can be beneficially converted to a catalytically applicable form by thermal treatment. This thermal treatment is generally performed by heating one of these forms in an atmosphere such as air, nitrogen, steam, etc., at a temperature of at least 700° F. (371° C.) for at least one minute and generally not more than 20 hours to remove part or all of the water and the organic constituent. While subatmospheric pressure can be employed for the thermal treatment, atmospheric pressure is desired for reasons of convenience. The thermal treatment can be performed at a temperature up to about 1700° F. (927° C.). The thermally treated product is particularly useful in the catalysis of certain hydrocarbon conversion reactions.

Simple dehydration can also be performed at ambient temperatures such as merely by placing the ZSM-12 type catalyst in a vacuum, but a longer time is required to obtain a sufficient amount of dehydration.

In the case of many catalysts, it is desired to incorporate the zeolite with another material resistant to the temperatures and other conditions employed in organic conversion processes. Such materials include active and inactive material and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the zeolite material, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. These materials may be incorporated into naturally-occurring clays, e.g. bentonite and kaolin, to improve the crush strength of the catalyst under commercial operating conditions. Said material, i.e. clays, oxides, etc. function as binders for the catalyst. It is required to provide a catalyst having good crush strength because in commercial use it is desirable to prevent the catalyst from breaking down into powder-like materials. These clay binders also improve the crush strength of the catalyst.

Naturally-occurring clays which can be composited with the ZSM-12 type catalyst include the montmorillonite and kaolin family, which families include the subbentonites, and the kaolins commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the catalyst also include inorganic oxides, notably alumina.

In addition to the foregoing materials, the ZSM-12 type catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The relative proportions of finely divided catalyst and inorganic oxide gel matrix vary widely with the zeolite content ranging from about one to about 90 percent by weight and more usually, particularly when the composite is prepared in the form of beads, in the range of about 2 to about 50 percent by weight of the composite.

Employing a catalytically active form of the ZSM-12 type catalyst of this invention which may contain additional hydrogenation components, reforming stocks can be reformed employing a temperature between 700° F. (371° C.) and 1000° F. (538° C.). The pressure can be between 100 and 1000 psig but is preferably between 200 and 700 psig. The liquid hourly space velocity is generally between 0.1 and 10, preferably between 0.5 and 4 and the hydrogen to hydrocarbon mole ratio is generally between 1 and 20 preferably between 4 and 12.

The catalyst can also be used for hydroisomerization of normal paraffins, when provided with a hydrogenation component, e.g. platinum. Hydroisomerization is carried out at a teperature between 200° (93° C.) and 700° F. (371° C.), preferably 300° (149° C.) to 550° F. (288° C.), with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin or aromatic isomerization employing temperatures between 30° F. (1° C.) and 700° F. (371° C.).

The catalyst can also be used for reducing the pour point of gas oils. This reduction is carried out at a liquid hourly space velocity between about 10 and about 30 and a temperature between about 800° F. (427° C.) and about 1100° F. (593° C.).

Other reactions which can be accomplished employing the catalyst of this invention containing a metal, e.g. platinum, include hydrogenation-dehydrogenation reactions and desulfurization reactions, olefin polymerization (oligomerization) and other organic compound conversion such as the conversion of alcohols (e.g. methanol) to hydrocarbon.

In order to more fully illustrate the nature of the invention and the manner of practicing same, the following examples are presented, wherein ZSM-12 crystals of good crystallinity were prepared.

In the examples which follow whenever adsorption data are set forth for comparison of sorptive capacities for water, cyclohexane and n-hexane, they were determined as folllows:

A weighed sample of the calcined adsorbent was contacted with the desired pure adsorbate vapor in an adsorption chamber, evacuated to 1 mm and contacted with 12 mm Hg water vapor or 20 mm Hg cyclohexane or n-hexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period which did not exceed about eight hours. An adsorbate was adsorbed by the silico-crystal, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 g of calcined adsorbent.

The following examples will illustrate the novel process of this invention.

EXAMPLE 1

Aluminum nitrate, $Al(NO_3)_3.9H_2O$, 1.6 g, was dissolved in 180 g of water. Diethyldimethylammonium bromide, $(C_2H_5)_2(CH_3)_2NBr$, 16.9 g, was added and dissolved. A solution of 5 g of sodium hydroxide in 50 g of water and, finally, 48 g of Hi-Sil, a precipitated silica containing about 10% water, were added. The reaction mixture was digested at ambient temperature for 24 hours and then heated at 150° C. for crystallization for 10 days. The reaction mixture composition can be summarized as follows:

| | |
|---|---|
| $SiO_2/Al_2O_3$ = | 338 |
| $Na_2O/(Na_2O + DEDMA_2O)$ = | 0.57 |
| $(Na_2O + DEDMA_2O)/SiO_2$ = | 0.15 |
| $OH^-/SiO_2$ = | 0.15 |
| $H_2O/(Na_2O + DEDMA_2O)$ = | 122 |

The crystalline product was filtered, washed with water and dried at ambient temperature. It gave the x-ray diffraction pattern of ZSM-12 having good crystallinity compared with a reference sample. The sorption capacities, in g/100 g, were:

| | |
|---|---|
| Cyclohexane, 20 Torr | 6.8 |
| n-Hexane, 20 Torr | 6.5 |
| Water, 12 Torr | 6.4 |

The chemical composition of the product was, in wt. %.

| | |
|---|---|
| $SiO_2$ | 88.8 |
| $Al_2O_3$ | 1.05 |
| $Na_2O$ | 0.59 |
| N | 1.16 |
| Ash | 90.8 |
| $SiO_2/Al_2O_3$ | 144 |

The Product of Example 1 had the following X-ray diffraction data

| 2 Theta | d (Å) | I/I$_o$ |
|---|---|---|
| 7.37 | 11.99 | 37 |
| 7.57 | 11.67 | 28 |
| 8.81 | 10.04 | 21 |
| 12.09 | 7.32 | 1 |
| 14.42 | 6.14 | 2 |
| 14.71 | 6.02 | 3 |
| 15.17 | 5.84 | 4 |
| 18.63 | 4.76 | 19 |
| 18.89 | 4.70 | 12 |
| 19.11 | 4.64 | 7 |
| 19.99 | 4.44 | 4 |
| 20.90 | 4.25 | 100 |
| 21.27 | 4.18 | 7 |
| 21.78 | 4.08 | 7 |
| 22.36 | 3.98 | 15 |
| 22.90 | 3.88 | 70 |
| 23.17 | 3.84 | 52 |
| 23.80 | 3.74 | 4 |
| 24.42 | 3.65 | 6 |
| 25.14 | 3.54 | 11 |
| 25.71 | 3.47 | 27 |
| 26.20 | 3.40 | 26 |
| 26.77 | 3.33 | 22 |
| 27.93 | 3.20 | 12 |
| 28.42 | 3.14 | 4 |
| 29.21 | 3.06 | 11 |
| 30.88 | 2.896 | 15 |
| 31.69 | 2.824 | 3 |
| 32.64 | 2.743 | 2 |
| 32.90 | 2.722 | 3 |

-continued

| | | |
|---|---|---|
| 33.72 | 2.658 | 6 |
| 34.21 | 2.621 | 2 |
| 34.52 | 2.598 | 4 |
| 35.70 | 2.515 | 17 |
| 36.15 | 2.485 | 2 |
| 36.50 | 2.462 | 3 |
| 36.91 | 2.435 | 9 |
| 37.69 | 2.387 | 2 |
| 38.41 | 2.344 | 7 |
| 39.13 | 2.302 | 2 |
| 39.65 | 2.273 | 4 |
| 40.92 | 2.205 | 3 |
| 41.71 | 2.166 | 2 |
| 42.53 | 2.126 | 2 |
| 42.88 | 2.109 | 2 |
| 43.69 | 2.072 | 4 |
| 44.46 | 2.038 | 12 |
| 45.44 | 1.996 | 6 |
| 46.09 | 1.969 | 2 |
| 46.80 | 1.941 | 6 |
| 47.45 | 1.916 | 3 |
| 47.90 | 1.899 | 3 |
| 49.33 | 1.847 | 3 |
| 49.87 | 1.829 | 3 |
| 50.41 | 1.810 | 5 |
| 51.20 | 1.784 | 5 |

EXAMPLE 2

The product of Example 1 was sized 14–25 mesh and calcined in a tube furnace in an ammonia stream to 600° C. The sample was held at this temperature for one hour, then cooled to room temperature in an ammonia atmosphere. The calcined material was exchanged three times with a solution 0.1 normal in $NH_4Cl$ and 0.1N in $NH_4OH$, 45 cc/g at 71° C. in a sealed plastic container for one hour each. After washing with water at room temperature until free of chloride, the product was dried at ambient temperature. It contained 0.03% of residual sodium.

EXAMPLE 3

A portion of the product of Example 2 was calcined for three hours in air at 538° C. The n-hexane cracking test gave an alpha-activity of 53.

EXAMPLE 4

Sodium hydroxide, 3.1 g, was dissolved in 56.7 g of water. A 45.6% solution of diethyldimethylammonium bromide, 44.7 g, was added, followed by 100 g of colloidal silica sol (30% $SiO_2$). The mixture was digested at ambient temperature for 24 hours and then heated at 170° C. for five days. The composition of the reaction mixture can be summarized as follows:

| | |
|---|---|
| $Na_2O/(Na_2O + DEDMA_2O)$ = | 0.40 |
| $(Na_2O + DEDMA_2O)/SiO_2$ = | 0.19 |
| $OH^-/SiO_2$ = | 0.15 |
| $H_2O/(Na_2O + DEDMA_2O)$ = | 90 |

The crystalline product was filtered, washed with water and dried at ambient temperature. It gave the x-ray diffraction pattern of ZSM-12 of 100% crystallinity compared with a reference sample. The sorption capacities, in g/100 g, were:

| | |
|---|---|
| Cyclohexane, 20 Torr | 4.7 |
| n-Hexane, 20 Torr | 4.8 |
| Water, 12 Torr | 2.9 |

The chemical composition of the product was:

| | |
|---|---|
| $SiO_2$, wt. % | 88.8 |
| $Al_2O_3$, ppm | 515 |
| $Na_2O$, wt. % | 0.73 |
| N, wt. % | 0.83 |
| Ash, wt. % | 90.3 |
| $SiO_2/Al_2O_3$, molar | 2930 |

EXAMPLE 5

A reaction mixture identical to that of Example 1 was heated at 160° C. for 137 hours. A product that gave the x-ray diffraction pattern of ZSM-12 was obtained. The sorption capacities, in g/100 g, were:

| | |
|---|---|
| Cyclohexane, 20 Torr | 7.2 |
| n-Hexane, 20 Torr | 6.3 |
| Water, 12 Torr | 7.9 |

The chemical composition of the product was, in wt. %:

| | |
|---|---|
| $SiO_2$ | 85.2 |
| $Al_2O_3$ | 1.1 |
| $Na_2O$ | 0.54 |
| N | 1.00 |
| Ash | 90.0 |
| $SiO_2/Al_2O_3$, molar | 132 |

EXAMPLE 6

Sodium hydroxide, 3.1 g, was dissolved in 45 g of water. A 45.6% solution of diethyldimethylammonium bromide, 67.1 g, was added, followed by 100 g of silica sol (30% $SiO_2$). The mixture was digested at ambient temperature for 24 hours and then heated at 160° C. for 298 hours. The product gave the x-ray diffraction pattern of ZSM-12, but contained an unidentified crystalline impurity. The sorption capacities, in g/100 g, were:

| | |
|---|---|
| Cyclohexane, 20 Torr | 5.9 |
| n-Hexane, 20 Torr | 6.2 |
| Water, 12 Torr | 3.7 |

The chemical composition of the product was, in wt. %:

| | |
|---|---|
| $SiO_2$ | 87.6 |
| $Al_2O_3$, ppm | 656 |
| $Na_2$ | 0.61 |
| N | 1.04 |
| Ash | 89.13 |
| $SiO_2/Al_2O_3$, molar | 2546 |

EXAMPLE 7

The reaction mixture was identical to that of Example 4. The mixture was heated at 200° C. for 113 hours. The crystalline product was filtered, washed with water and dried at ambient temperature. It gave the x-ray diffraction pattern of ZSM-12. The sorption capacities, in g/100 g, were:

| | |
|---|---|
| Cyclohexane, 20 Torr | 5.5 |

-continued

|  |  |
|---|---|
| n-Hexane, 20 Torr | 5.3 |
| Water, 12 Torr | 1.8 |

The chemical composition of the product was:

|  |  |
|---|---|
| SiO$_2$, wt. % | 91.7 |
| Al$_2$O$_3$, ppm | 405 |
| Na$_2$O, wt. % | 0.42 |
| N, wt. % | 0.87 |
| Ash, wt. % | 91.3 |
| SiO$_2$/Al$_2$O$_3$, molar | 3849. |

What is claimed is:

1. A method for preparing crystalline zeolite ZSM-12 which comprises preparing a reaction mixture containing a source of an alkali or alkaline earth metal oxide, an oxide of silicon, diethyldimethylammonium ion, and water and having a composition, in terms of mole ratios of oxides, within the following ranges:

|  |  |
|---|---|
| SiO$_2$/Al$_2$O$_3$ | = 40 or higher |
| M$_2$O/(DEDMA)$_2$O | = 0.2 to 2.0 |
| H$_2$O/OH$^-$ | = 50 to 400 |
| OH$^-$/SiO$_2$ | = 0.05 to 0.35 | wherein M is an alkali or alkaline earth metal and DEDMA is a diethyldimethylammonium ion, and maintaining said mixture under crystallization conditions until crystals of said zeolite are formed.

2. A method according to claim 9 wherein said mixture has a composition, in terms of mole ratios of oxides, within the following ranges:

|  |  |
|---|---|
| SiO$_2$/Al$_2$O$_3$ | = 80 or higher |
| M$_2$O/(DEDMA)$_2$O | = 0.3 to 1.8 |
| H$_2$O/OH$^-$ | = 70 to 350 |
| OH$^-$/SiO$_2$ | = 0.10 to 0.30 | wherein M and DEDMA are as before.

3. A method according to claim 1 wherein substantially no alumina is present.

4. A method according to claim 2 wherein substantially no alumina is present.

5. Diethyldimethylammonium-containing ZSM-12 exhibiting a characteristic X-ray diffraction pattern as shown in Table 1 of the specification.

* * * * *